United States Patent [19]
Kumar et al.

[11] Patent Number: 5,513,716
[45] Date of Patent: May 7, 1996

[54] ADAPTIVE MOBILITY SYSTEM

[75] Inventors: Vijay Kumar, Wilmington, Del.; Parris Wellman, Drexel Hill; Venkat Krovi, Philadelphia, both of Pa.

[73] Assignee: Trustees of the University of Pennsylvania, Philadelphia, Pa.

[21] Appl. No.: 239,951

[22] Filed: May 9, 1994

[51] Int. Cl.$^6$ .................................................. B62D 57/028
[52] U.S. Cl. ...................... 180/8.3; 280/250.1; 280/304.1
[58] Field of Search .................. 180/8.1, 8.2, 8.3, 180/8.4, 8.5, 8.6, 907; 901/1, 14, 15; 280/250.1, 304.1, 1.181, 218, 219

[56] References Cited

U.S. PATENT DOCUMENTS

| | | | |
|---|---|---|---|
| 3,269,478 | 12/1965 | Joslyn | 180/8.2 |
| 4,142,641 | 3/1979 | Dake | 414/541 |
| 4,408,949 | 10/1983 | Witty | 180/8.4 X |
| 4,759,418 | 7/1988 | Goldenfeld et al. | 180/65.1 |
| 4,802,542 | 2/1989 | Houston et al. | 180/65.5 |
| 4,846,527 | 7/1989 | Julien et al. | 297/411 |
| 4,890,853 | 1/1990 | Olson | 280/87.021 |
| 4,913,264 | 4/1990 | Voves et al. | 187/12 |
| 5,064,209 | 11/1991 | Kurschat | 280/204 |
| 5,113,959 | 5/1992 | Mastov et al. | 180/11 |
| 5,137,101 | 8/1992 | Schaeff | 180/8.1 |
| 5,137,102 | 11/1992 | Houston, Sr. et al. | 180/65.5 |
| 5,224,731 | 7/1993 | Johnson | 280/648 |
| 5,253,724 | 10/1993 | Prior | 180/907 X |

FOREIGN PATENT DOCUMENTS

| | | | |
|---|---|---|---|
| 2546839 | 12/1984 | France | 180/8.3 |
| 3006411 | 9/1981 | Germany | 180/8.2 |
| 33172 | 2/1985 | Japan | 180/8.3 |

OTHER PUBLICATIONS

Shigeo Hirose; *The International Journal of Robotics Research*, vol. 3, No. 2, Summer 1984; "A Study of Design and Control of a Quadruped Walking Vehicle." Hirofumi Miura, Isao Shimoyama; *The International Journal of Robotics Research*, vol. 3, No. 2, Summer 1984; "Dynamic Walk of a Biped." Kenneth J. Waldron, Vincent J. Vohnout, Arrie Pery, Robert B. McGhee; *The International Journal of Robotics Research*, vol. 3, No. 2, Summer 1984; "Configuration Design of the Adaptive Suspension Vehicle." Shigeo Hirose, Akio Morishima; *The International Journal of Robotics Research*, vol. 9, No. 2, Apr. 1990; "Design and Control of a Mobile Robot with an Articulated Body." *Home Care*; Nov. 1992; "Atlanta Show Products."

*Primary Examiner*—Kevin T. Hurley
*Attorney, Agent, or Firm*—Woodcock Washburn Kurtz Mackiewicz & Norris

[57] ABSTRACT

A wheeled mobility system, such as a wheelchair, having articulated limbs for providing a tractive force between the mobility system and a surface. The articulated limbs provide tractive locomotive forces under abnormal operating conditions wherein wheeled locomotion is inhibited by an obstacle or the like. Controlled drive motors coupled to the articulated limbs and the wheels of the mobility system provide for redundant actuation of the limbs and wheels. The wheeled mobility system is inherently omni-directional, provides superior mobility in difficult terrain or soil conditions, such as sand, clay, gravel and rocks, and further provides for surmounting of obstacles, such as steps, ditches and rocks. The limbs also give the chair versatility and allow it to be re-configured to satisfy the comfort requirements of the user. The limbs can further be used as a manipulator in order to perform tasks such as reaching for objects or pushing open doors.

33 Claims, 3 Drawing Sheets

5,513,716

ADAPTIVE MOBILITY SYSTEM

FIELD OF THE INVENTION

This invention relates to mobility systems. More particularly, the invention relates to mobility systems, such as a wheelchair, having a plurality of wheels for providing general locomotive forces under normal operating conditions and further having a plurality of articulated limbs for providing tractive locomotive forces under abnormal operating conditions wherein wheeled locomotion may be inhibited by obstacles, such as steps, ditches or rocks, or impeded by poor traction due to adverse surface conditions.

BACKGROUND OF THE INVENTION

Wheeled locomotive devices have made it increasingly convenient and efficient to transport a payload great distances on a prepared surface or the like, particularly where the wheels are powered by some type of motor. An example of such a wheeled locomotion system is a powered wheelchair for conveniently and rapidly transporting an operator. Such powered wheelchairs have opened up vast realms of opportunity for the disabled by providing means of transportation over streets, sidewalks and hallways.

Although motorized wheelchairs with sophisticated controls are available for the disabled, these devices are restricted to the smooth, prepared surfaces of streets, hallways and the like. Notwithstanding the ability of some skilled operators to maneuver a wheelchair around obstacles such as curbs, it is generally difficult to surmount obstacles with a wheelchair, particularly a powered chair having the increased weight of the motor system. While architectural modifications such as curb cuts, ramps and elevators improve accessibility and are relatively low cost solutions, they are limited. Moreover, wheelchair users often cannot enjoy areas having a non-prepared surface, such as the soft ground of a park or garden, nor can they easily cross patches of mud or surmount potholes, steps and other abnormalities of prepared surfaces.

Although powered wheelchairs are available that have special purpose aids such as stair climbers, these devices are limited in function, are not versatile, and tend to be expensive.

Alternatively, legged vehicles are known that provide for locomotion in environments cluttered with obstacles where wheeled vehicles cannot be used. Statically stable multi-legged robots are known for carrying a payload through such environments. One of ordinary skill recognizes that a multiple legged mobility system is inherently omni-directional and provides superior mobility in conditions which are otherwise generally unpassable by wheeled devices, such as sand. However, such legged devices do not provide the efficiency of traveling great distances on a prepared surface as provided by wheeled systems. Moreover, legged vehicles are not practical for a variety of reasons, including the associated cost and complexity of the system.

Thus, there is a long-felt, yet unfulfilled need for an efficient and practical mobility system for transporting a payload over a prepared surface, as well as over an unprepared surface, and around obstacles such as steps or the like. The present invention provides a mobility system that satisfies this need.

SUMMARY OF THE INVENTION

An adaptive mobility system comprises a frame for supporting a payload and a plurality of wheels, preferably powered by a motor, for supporting the frame upon a surface. At least one articulated limb connected to the frame contacts the surface for providing tractive forces over abnormal surface conditions. The limbs provide for locomotion in environments cluttered with obstacles where wheeled or tracked vehicles are primarily inoperable. Moreover, the inclusion of articulated limbs in the system makes the inherently stable, passively supported, wheeled system versatile and adaptable to abnormal surface conditions.

A wheeled mobility system, such as a wheelchair, having articulated limbs is inherently omni-directional and provides superior mobility in difficult terrain or soil conditions, such as sand, clay, gravel and rocks. The legged wheelchair provides an active suspension, and thus, a better ride for the user. The limbs also give the chair versatility and allow it to be re-configured to satisfy the comfort requirements of the user. The limbs can further be used as a manipulator in order to perform tasks such as reaching for objects or pushing open doors.

DESCRIPTION OF THE PREFERRED EMBODIMENTS

Figure 1:
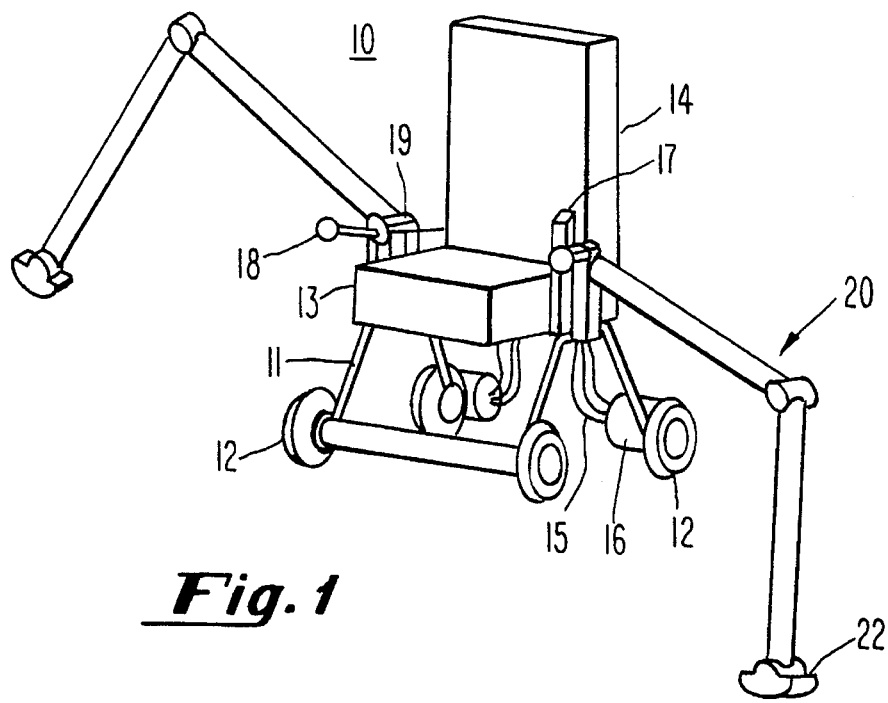
FIG. 1 shows a perspective view of a walking wheelchair mobility system in accordance with this invention.

A walking wheelchair mobility system 10 is shown in FIG. 1. A frame 11 for supporting a payload, such as a disabled person, is supported upon four wheels 12. Wheels 12 are mechanically and rotatably connected to the frame 11 and support the frame upon a surface for providing tractive, or motive, forces between the mobility system 10 and the surface to transport the mobility system on the surface in a known manner. Frame 11 includes a base 13 and backrest 14 which support the disabled operator.

In a preferred embodiment, the mobility system 10 is electromechanically powered by electric motors 16 which are electromechanically connected to the two rear wheels 12. The electric motors 16 actuate the rear wheels for providing a tractive force between the mobility system and the surface it is supported upon. The electric motors 16 are connected by wiring 15 to a battery (not shown) in a known manner for supplying the power necessary to rotate the wheels. Thus, in this embodiment the wheels are electrically powered such that the wheels provide tractive forces necessary for propelling the wheelchair on a surface. An electromechanical wheel power system is advantageous since rechargeable batteries are generally used in commercially available wheelchairs and have proven efficiency. In the embodiment shown, electric motors are individually connected to the two rear wheels such that each rear wheel has a separate power source for driving the wheels in a known manner. However, the present invention is not intended to be limited in this manner and one of ordinary skill in the art will recognize the equivalent use of other known drive systems, such as hydraulically or pneumatically operated power systems, for providing powered operation of a mobility system such as a wheelchair.

Controller 17 provides control signals to the electric motors 16 for controlling actuation of the rear wheels in a known manner. Lever 18, connected to arm rests 19, is coupled to the controller and used by the system operator for controlling the operation of the powered wheels in a known manner. However, the control system of the present invention is not intended to be limited to the joy-stick type operation of lever 18 and any system wherein the user inputs signals indicating a desired direction of mobility, such as an optical controller or one operated by movement of the operator's head, is within the scope of the invention. Controller 17 can include a video output display terminal for indicating a variety of control options to the disabled user. Thus, a powered mobility system in accordance with the present invention provides a convenient and efficient mode of transportation for a disabled passenger over a prepared surface such as a sidewalk or hallway.

Articulated limbs 20 are supported upon frame 11 for providing tractive forces for transporting the mobility system on a surface. The articulated limbs are operated such that grips at the distal end 22 of articulated limbs 20 are positioned to contact a surface for providing a tractive force between the mobility system and the surface in a known manner. However, the present invention is not intended to be limited in this manner and, as described below, the distal end of the articulated limbs can be positioned on one surface, such as the top surface of a step, for providing a tractive force to transport the mobility system on another surface, such as the surface at the foot of the step. Also, the articulated limbs can be operated such that the limbs are used as manipulators for opening a door or activating a switch when the distal end of the limb is placed into contact with a surface on such a door or the like.

In the preferred embodiment shown in FIG. 1, the mobility system has two articulated limbs 20. However, the present invention is not intended to be limited in this manner and any number of limbs can be provided, depending upon the mobility requirements, and a mobility system having only one limb is within the scope of this invention. However, the number of limbs will be limited by the increase in the overall system weight resulting from the addition of limbs, as well as the increased complexity Of controlling the operation of a large number of limbs.

The articulated limbs 20 can be manually operated by the disabled user wherein the user manipulates the limbs into contact with a surface. However, manual operation of the articulated limbs is difficult for many disabled users and a system for electrically powered actuation and control of the articulated limbs of a mobility system is set forth in detail below.

The articulated limbs 20 provide tractive forces that are separate from those tractive forces provided by the electrically rotated wheels 12 discussed above. Thus, if powered operation malfunctions such that the wheels cannot be electrically rotated, the articulated limbs can provide the tractive forces necessary for transporting the wheelchair in such an emergency and the wheels simply function as passive castors. In the case where the electric wheels are fully operative, the articulated limbs can provide for maneuvering the mobility system around an obstacle, such as a step, in the manner set forth below.

Figure 2:
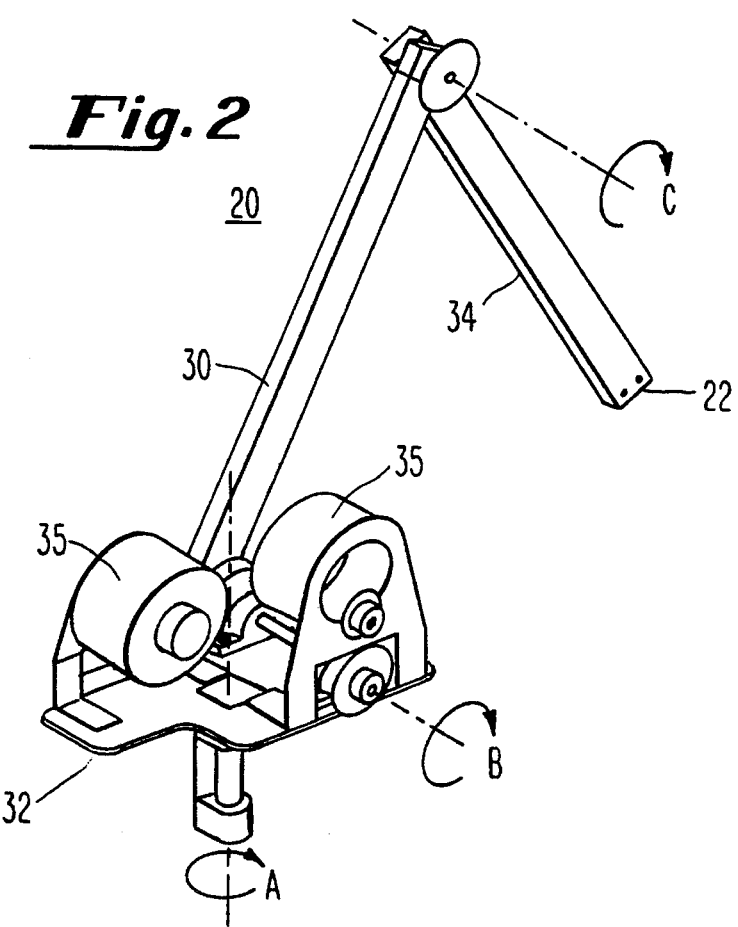
FIG. 2 shows an actuator platform and articulated limb in accordance with this invention.

A three-degree-of-freedom articulated limb 20 for use in a mobility system in accordance with the present invention is shown in FIG. 2. A first limb segment 30 is rotatably connected to a platform 32 and the platform 32 is rotatably mounted onto the frame 11 at arm rest 19. Platform 32 rotates about axis A to position the articulated limb 20 at locations around the frame 11. A second limb segment 34 is rotatably connected by an articulated joint to the first limb segment 30. Thus, the first and second limb segments 30, 34 are rotatable about axis B and the second limb segment 34 is further rotatable about axis C such that the distal end 22 of the articulated limb can be positioned into contact with a surface in a known manner. Such a three-degree-of-freedom limb can be actuated such that the distal end of the limb can be positioned to contact any point in a spherical workplace within a radius equal to the combined length of the first and second limb segments.

The present invention is not intended to be limited to the three-degree-of-freedom limb design described. The system can be implemented using parallel drive linkage systems or serial drives, for example. Moreover, the limb may have any number of degrees of freedom, such as six, depending upon the design requirements, with a three-degree-of-freedom limb providing the necessary minimum omni-directional locomotion capabilities.

The platform 32 is electrically operated such that the platform rotates about a vertical axis A. The primary drive motors 35 drive the first and second limb segments 30, 34 in parallel about axis B and axis C through a chain and sprocket drive mechanism known in the art. The motors of the articulated limb are coupled to controller 17 such that the controller provides signals for actuating the articulated limbs in a known manner.

Preferably, the control system in accordance with the present invention is optimally controlled such that controller 17 provides for redundant actuation of the wheels and limbs. Where the control system provides for redundant actuation of the wheels and limbs of the mobility system, the operation of the wheels and limbs is optimally coordinated. The control system utilizes the redundancy in the system by distributing the traction between the different locomotion elements, i.e, the limbs and the wheels or the like, in an optimal manner. Thus, the control system minimizes the tendency for any of the locomotion elements to slip or skid. In this manner, where the powered drive actuators of the wheels fail to operate, the powered actuators for the limbs remain operable, or vice versa, for providing the tractive forces necessary to transport the mobility system on a surface. Moreover, control of the system to redundantly actuate the wheels and limbs provides that the powered actuators for both the wheels and the limbs operate simultaneously in a coordinated manner such that tractive forces are optimally provided by the wheels and the limbs. Also, input signals from optical sensors and/or position contact sensors located on the articulated limbs can be input to the control system and operation of the limbs can be controlled in response to such signals.

Figure 3A:
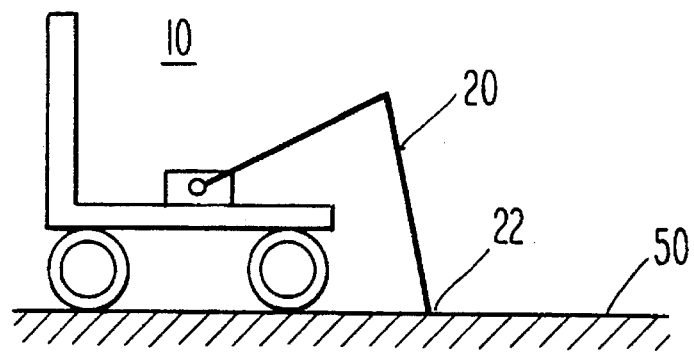
FIGS. 3a–c show a diagram illustrating an operation of a walking wheelchair mobility system in accordance with this invention.
Figure 3B:
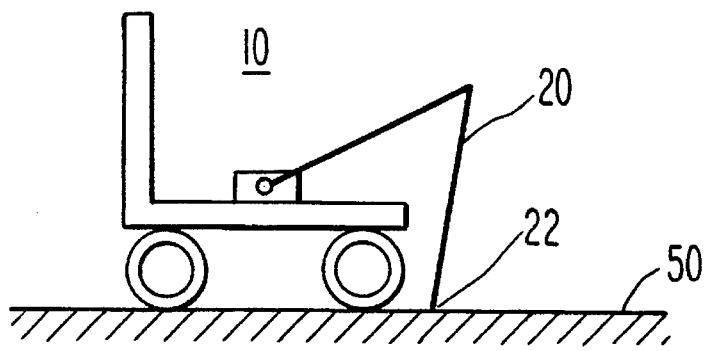
Figure 3C:
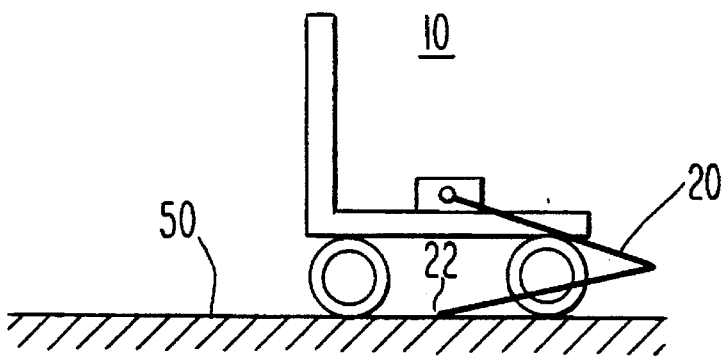

One operation of a walking wheelchair mobility system 10 in accordance with the present invention is shown in FIGS. 3a–c wherein the mobility system 10 is transported upon a surface 50. In FIG. 3a, the articulated limbs 20 are actuated such that the distal end 22 of the limbs is positioned into contact with the surface 50 upon which the mobility system is supported. At FIGS. 3b and 3c, the articulated limbs 20 are further actuated to create a tractive force between the mobility system and the surface for transporting the mobility system on that surface. As set forth above, powered wheels can also be actuated to create tractive forces to locomote the mobility system when the limbs are in use.

Figure 4A:
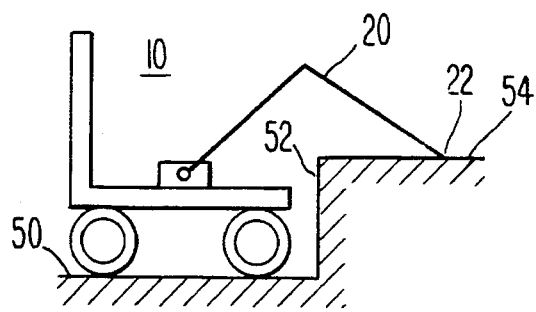
FIGS. 4a–f show a diagram illustrating another operation of a walking wheelchair mobility system in accordance with this invention.
Figure 4B:
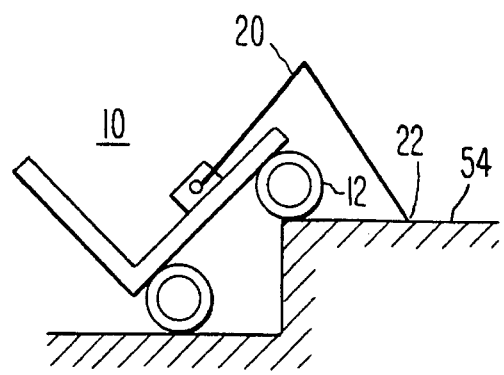
Figure 4C:
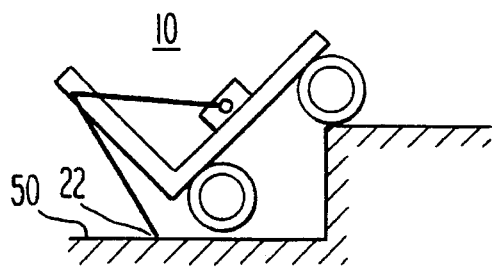
Figure 4D:
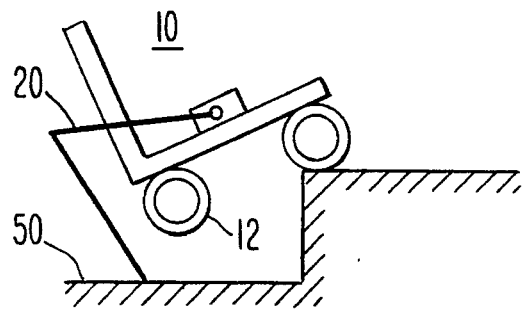
Figure 4E:
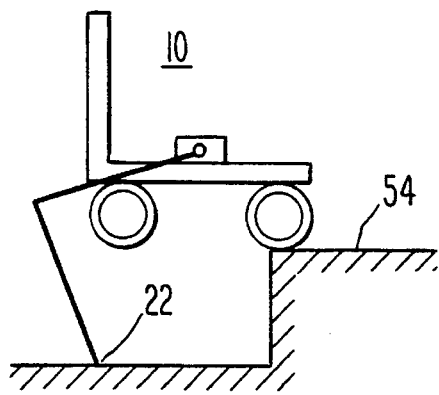
Figure 4F:
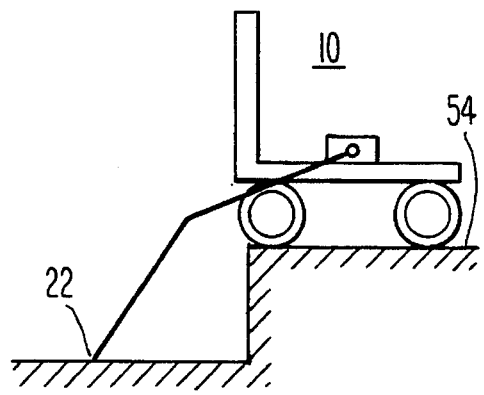

The operation of surmounting a typical obstacle, such as climbing a step, with a walking wheelchair mobility system in accordance with the present invention is shown in FIGS. 4a–f. As shown in FIG. 4a, as the mobility system 10 approaches a step 52 on surface 50 the articulated limbs 20 are actuated to position the distal end 22 of the limbs 20 on the top surface 54 of the step. As shown in FIG. 4b, the front wheels 12 are lifted onto the top surface 54 of the step as the limbs 20 pull the chair toward the step. As shown in FIG. 4c, after the front wheels have been placed upon the top surface 54 of the step, the limbs 20 are further actuated to position the distal end 22 of the limbs onto surface 50 behind the mobility system 10. At FIG. 4d, the articulated arms are actuated to lift the rear wheels 12 off surface 50 and into the air. As shown in FIGS. 4e and 4f, the limbs 20 are further actuated such that the limbs provide a tractive force for pushing the mobility system 10 onto the top surface 54 of the step. After the step has been mounted, the limbs can be retracted into a non-use position and operation of the wheelchair with the wheels only is resumed on the prepared surface after the step.

Thus, a limbed wheelchair mobility system 10 can accomplish many of the maneuvers of a statically stable multi-legged walking system by decomposing such maneuvers into a series of steps that involve maneuvering of one or more limbs at a time.

The present invention is not intended to be limited to wheelchair mobility systems for transporting a disabled operator. For example, an unmanned, semi-autonomous mobility system in accordance with the present invention can be used in planetary exploration over the rough surfaces of a planet such as the moon. Further, an unmanned system can be used in military reconnaissance missions. In such a mobility system, the control system can include sensors, such as TV cameras, for broadcasting images to a remote operator at a control station wherein that operator provides signals to the control system for optimally actuating the wheels and/or limbs of the mobility system. Also, a mobility system in accordance with the present invention can be remotely controlled to carry out a variety of operations for transporting payloads in a manufacturing facility or the like.

Also, as shown in FIGS. 4a–4f, the limbs of the mobility system can be used to provide lifting forces for maneuvering the system in a desired manner. For example, where the mobility system becomes distressed such that the locomotive means other the limbs fail to operate, such as where a wheeled planetary exploration vehicle tips over, the articulated limbs can be used to provide lifting forces to return the mobility system to an upright, operating position. In such a mobility system, the control system includes onboard vision sensors and contact sensors to provide decision-making logic signals for optimally controlling actuation of the limbs in a manner necessary to adjust the vehicle without input from a remote operator. In a mobility system having such a control system, the limbs can be further used to actively sense and explore the environment.

Moreover, the present invention is not intended to be limited to mobility systems having wheels, whether powered or not. Thus, other locomotion members, such as rollers or castors, which passively support the frame of the mobility system and can be actuated for providing a motive, or tractive, force to locomote the mobility system are within the scope of the invention.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A wheelchair, comprising;
   a frame having first and second side members and a seat supported therebetween;
   a pair of front wheels mechanically connected to said frame and rotatable about a first axis and a pair of rear wheels mechanically connected to said frame and rotatable about a second axis, said front and rear wheels being supported upon a surface; and
   first and second articulated limbs having a proximal end, said proximal end of the first articulated limb being rotatably connected to said first side member and said proximal end of the second articulated limb being rotatably connected to said second side member, the first and second articulated limbs being rotatable about a substantially vertical axis, each of the first and second articulated limbs having a distal end for contacting said surface to provide a tractive force between said wheelchair and said surface, each of the first and second articulated limbs being articulable to position the distal end at a location forward of the front wheels and a location rearward of the rear wheels.

2. The wheelchair of claim 1, further comprising an electric limb motor electromechanically coupled to each of said first and second articulated limbs for actuating said first and second articulated limbs.

3. The wheelchair of claim 2, further comprising a controller coupled to said electric limb motors for controlling the actuation of said first and second articulated limbs.

4. The wheelchair of claim 3, further comprising an electric wheel motor electromechanically coupled to each of either the front or rear wheels for actuating said wheels to provide a motive force between said wheelchair and said surface.

5. The wheelchair of claim 4, said controller coupled to said electric wheel motors for controlling the actuation of said wheels.

6. The wheelchair of claim 1, wherein each of said first and second articulated limbs comprises a first segment rotatably connected to a second segment by an articulated joint.

7. The wheelchair of claim 6, further comprising a first electric motor electromechanically coupled to said first segment of each of said first and second articulated limbs for actuating said first segment and a second electric motor electromechanically coupled to said second segment of each of said first and second articulated limbs for actuating said second segment.

8. The wheelchair of claim 7, further comprising a platform rotatably connected to each of said first and side members, each of said first and second articulated limbs and a corresponding one of said first and second electric motors mounted on a corresponding one of said platforms.

9. A mobility system for transporting a payload on a surface, comprising:
   a frame for supporting the payload;
   a plurality of locomotion members mechanically connected to said frame for supporting said frame upon said surface, said locomotion members actuated to provide a motive force between said frame and said surface; and
   at least one articulated limb having a proximal end mechanically connected to said frame and a distal end for contacting said surface to provide a tractive force between said frame and said surface, the articulated limb being rotatable about a substantially vertical axis and articulable to position the distal end at a location forward and a location rearward of the locomotion members.

10. The mobility system of claim 9, wherein said locomotion members are wheels.

11. The mobility system of claim 9, further comprising at least one actuator platform rotatably connected to said frame, the proximal end of at least one of said articulated limbs rotatably connected to the platform.

12. The mobility system of claim 11, wherein said platform rotates about a first axis and said articulated limb rotates about a second axis.

13. The mobility system of claim 12, wherein said second axis is normal to said first axis.

14. The mobility system of claim 11, at least one of said articulated limbs comprising first and second limb segments joined by an articulated joint.

15. The mobility system of claim 14, said platform being rotatable about a first axis, said first limb segment being rotatable about a second axis and said second limb segment being rotatable about a third axis.

16. The mobility system of claim 15, wherein said second axis is normal to said first axis and parallel to said third axis.

17. The mobility system of claim 9, further comprising an electric limb motor electromechanically coupled to at least one of said articulated limbs for actuating said articulated limb.

18. The mobility system of claim 17, further comprising a controller coupled to said electric limb motor for controlling actuation of said articulated limb.

19. The mobility system of claim 18, wherein said locomotion members are wheels, said mobility system further comprising an electric wheel motor electromechanically coupled to each of a plurality of wheels for actuating said wheels to provide a motive force between said mobility system and said surface.

20. The mobility system of claim 19, said controller being coupled to said electric wheel motors for controlling the actuation of said wheels.

21. The mobility system of claim 9, further comprising an electromechanical actuator for moving said articulated limbs into contact with said surface.

22. The mobility system of claim 9, further comprising a controller for controlling the articulation of said articulated limbs and the placement of said distal end.

23. The mobility system of claim 9, wherein said system is adapted to provide for manual actuation of said articulated limbs by a human operator.

24. The mobility system of claim 9, wherein said articulated limb is adapted to contact a second surface for lifting at least one of said wheels off the surface supporting said mobility system.

25. The mobility system of claim 9, wherein said articulated limb articulates in three degrees of freedom.

26. A wheelchair, comprising;

a frame having first and second side members and a seat supported therebetween;

a pair of front wheels mechanically connected to said frame and rotatable about a first axis and a pair of rear wheels mechanically connected to said frame and rotatable about a second axis, said front and rear wheels being supported upon a surface;

first and second articulated limbs comprising a first segment rotatably connected to a second segment by an articulated joint and having a proximal end, said proximal end of the first articulated limb being rotatably connected to said first side member and said proximal end of the second articulated limb being rotatably connected to said second side member, each of the first and second articulated limbs having a distal end for contacting said surface to provide a tractive force between said wheelchair and said surface;

a first electric motor electromechanically coupled to said first segment of each of said first and second articulated limbs for actuating said first segment and a second electric motor electromechanically coupled to said second segment of each of said first and second articulated limbs for actuating said second segment; and a platform rotatably connected to each of said first and side members, each of said first and second articulated limbs and a corresponding one of said first and second electric motors mounted on a corresponding one of said platforms.

27. A mobility system for transporting a payload on a surface, comprising:

a frame for supporting the payload;

a plurality of locomotion members mechanically connected to said frame for supporting said frame upon said surface, said locomotion members actuated to provide a motive force between said frame and said surface;

at least one articulated limb having a proximal end mechanically connected to said frame and a distal end for contacting said surface to provide a tractive force between said frame and said surface; and at least one actuator platform rotatably connected to said frame, the proximal end of at least one of said articulated limbs rotatably connected to the platform.

28. The mobility system of claim 27, wherein said platform rotates about a first axis and said articulated limb rotates about a second axis.

29. The mobility system of claim 28, wherein said second axis is normal to said first axis.

30. The mobility system of claim 27, at least one of said articulated limbs comprising first and second limb segments joined by an articulated joint.

31. The mobility system of claim 30, said platform being rotatable about a first axis, said first limb segment being rotatable about a second axis and said second limb segment being rotatable about a third axis.

32. The mobility system of claim 31, wherein said second axis is normal to said first axis and parallel to said third axis.

33. A mobility system for transporting a payload on a surface, comprising:

a frame for supporting the payload;

a plurality of locomotion members mechanically connected to said frame for supporting said frame upon said surface, said locomotion members actuated to provide a motive force between said frame and said surface; and at least one articulated limb having a proximal end mechanically connected to said frame and a distal end for contacting said surface to provide a tractive force between said frame and said surface, wherein said articulated limb articulates in three degrees of freedom.

* * * * *